(12) United States Patent
Brouwer et al.

(10) Patent No.: US 8,863,371 B2
(45) Date of Patent: Oct. 21, 2014

(54) POSITIONING SYSTEM AND METHOD FOR AUTOMATED ALIGNMENT AND CONNECTION OF COMPONENTS

(75) Inventors: Dominik Brouwer, Hannover (DE);
Joerg Lehr, Lower Saxony (DE);
Berend Denkena, Wedemark (DE);
Hans-Christian Möhring, Hannover (DE); Kai Litwinski, Hannover (DE)

(73) Assignee: Baker Hughes Incorporated, Houston, TX (US)

( * ) Notice: Subject to any disclaimer, the term of this patent is extended or adjusted under 35 U.S.C. 154(b) by 202 days.

(21) Appl. No.: 13/315,591

(22) Filed: Dec. 9, 2011

(65) Prior Publication Data
US 2013/0145590 A1 Jun. 13, 2013

(51) Int. Cl.
*B23Q 17/00* (2006.01)
(52) U.S. Cl.
USPC ............ 29/714; 29/721; 29/407.1; 33/412; 33/529; 166/77.51; 166/77.1; 166/380; 285/24
(58) Field of Classification Search
CPC ... H05K 13/0413; B23P 19/10; B23P 19/105; B23P 19/12; E21B 19/16; E21B 19/161; E21B 19/165; E21B 19/20
USPC ............ 29/720, 721, 407.1, 709–712, 714; 33/286, 412, 529; 166/255.2, 77.51, 166/75.11–97.5, 170–176, 378–387; 285/18, 24, 27
See application file for complete search history.

(56) References Cited

U.S. PATENT DOCUMENTS

| | | | |
|---|---|---|---|
| 5,595,248 A | 1/1997 | Denny | |
| 5,886,314 A | 3/1999 | Sims | |
| 6,078,031 A | 6/2000 | Bliault et al. | |
| 6,141,863 A | * 11/2000 | Hara et al. | ..................... 29/714 |
| 6,314,631 B1 | * 11/2001 | Pryor | ......................... 29/407.04 |

(Continued)

FOREIGN PATENT DOCUMENTS

| | | |
|---|---|---|
| EP | 0564535 A1 | 10/1993 |
| WO | 9211442 A1 | 7/1992 |

(Continued)

OTHER PUBLICATIONS

International Search Report and Written Opinion, International Application No. PCT/US2012/068454; International Filing Date: Dec. 7, 2012; Date of Mailing Mar. 14, 2013; 8 pages.

(Continued)

*Primary Examiner* — David Bryant
*Assistant Examiner* — Jun Yoo
(74) *Attorney, Agent, or Firm* — Cantor Colburn LLP

(57) ABSTRACT

A system for aligning and connecting components including a support structure and a measuring apparatus coupled to the support structure. The measuring apparatus is arranged to spatially analyze a first tubular component with respect to a second tubular component for determining an adjustment vector therebetween. An alignment apparatus is coupled to the support structure and in data communication with the measuring apparatus. The alignment apparatus includes a plurality of actuators operatively arranged in parallel for moving at least one of the first or second tubular components relative to the other for coaxially arranging the first and second tubular components in accordance with the adjustment vector. A connection apparatus is coupled to the support structure and operatively arranged for connecting the first and second tubular components together.

28 Claims, 8 Drawing Sheets

(56) References Cited

U.S. PATENT DOCUMENTS

| | | | |
|---|---|---|---|
| 6,335,508 B1 | 1/2002 | Nam | |
| 6,637,642 B1 | 10/2003 | Lingnau | |
| 6,935,429 B2 | 8/2005 | Badrak | |
| 7,047,614 B2 * | 5/2006 | Scott et al. | 29/407.05 |
| 7,090,254 B1 | 8/2006 | Pietras et al. | |
| 7,181,821 B2 | 2/2007 | Anderson et al. | |
| 7,282,663 B2 | 10/2007 | Alford et al. | |
| 7,348,523 B2 | 3/2008 | Slack et al. | |
| 7,474,221 B2 | 1/2009 | Den Boer et al. | |
| 7,509,722 B2 * | 3/2009 | Shahin et al. | 29/407.09 |
| 7,774,917 B2 | 8/2010 | Anderson et al. | |
| 7,874,471 B2 | 1/2011 | Fairchild et al. | |
| 2006/0108124 A1 | 5/2006 | Barker et al. | |
| 2008/0302539 A1 * | 12/2008 | Mallenahalli et al. | 166/380 |
| 2009/0320261 A1 * | 12/2009 | Park et al. | 29/407.1 |
| 2010/0212915 A1 | 8/2010 | Heidecke et al. | |
| 2011/0030512 A1 * | 2/2011 | Begnaud, Jr. | 81/57.34 |

FOREIGN PATENT DOCUMENTS

| | | |
|---|---|---|
| WO | 9832948 A1 | 7/1998 |
| WO | 2004/108341 A2 | 12/2004 |
| WO | 2011/012846 A1 | 2/2011 |

OTHER PUBLICATIONS

ITC Learning, [online]; [retrieved on Nov. 10, 2011]; retrieved from the Internet http://www.itclearning.com/ products/dvd-videos/pipe-valve-maintenance.html, "Piping and Valve Maintenance", 4p.

United Nations Industrial Development Organization, [online]; [retrieved on Nov. 10, 2011]; retrieved from the Internet http://www.unido.org/fileadmin/media/documents/pdf/Procurement/Notices/1103/15003030/ITB%2015003030_Clarification%20Note%203.pdf, "Clarification No. 3 Invitation to Bid (ITB) No. 15003030 AO Project No. MP/ARG/10/001—Phase-out of HCFC-22 in the Room and Unitary Air-Conditioning Equipment Manifacturing Sector," 5p.

\* cited by examiner

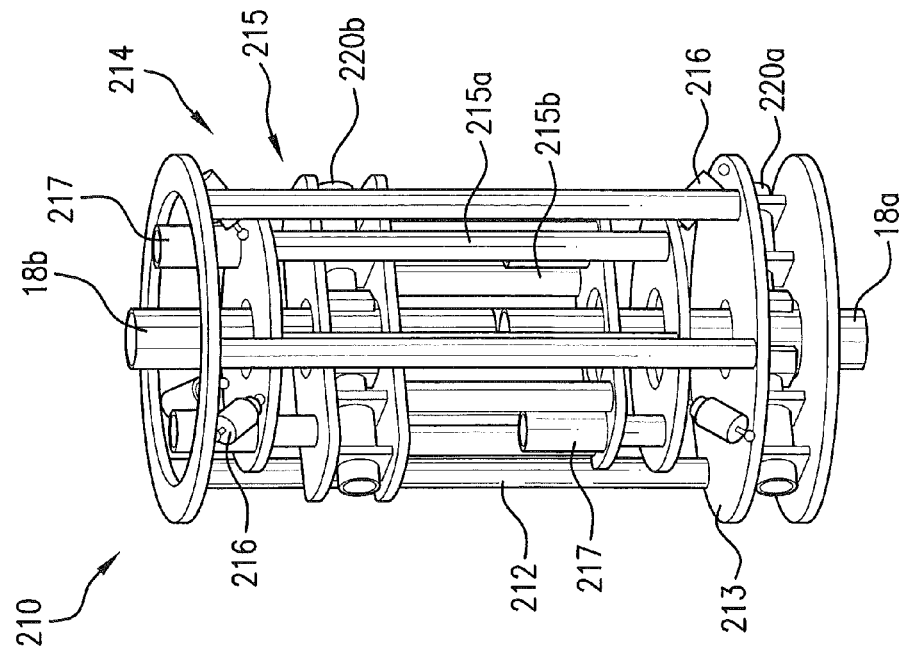
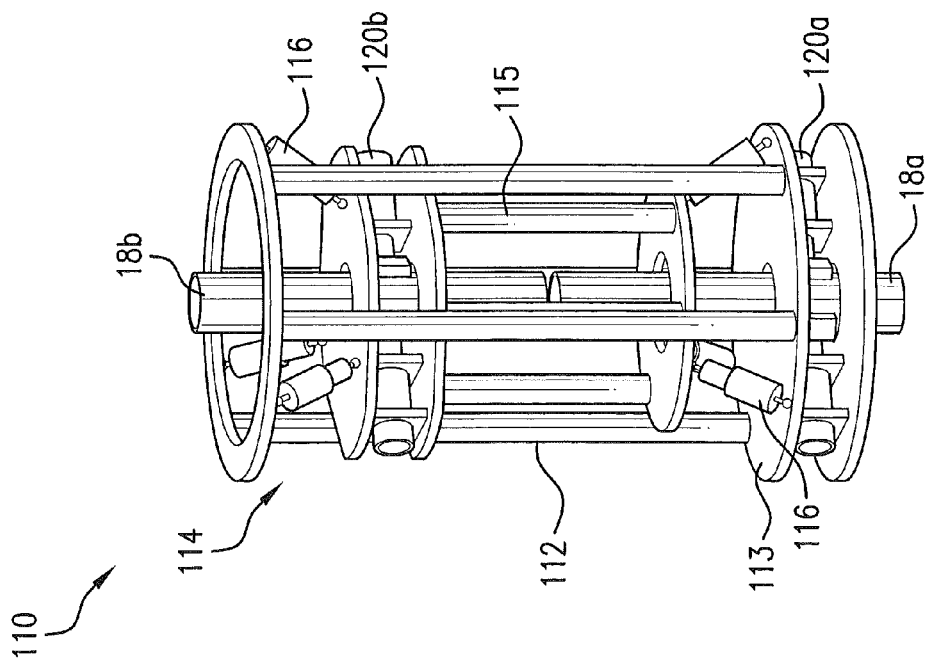
FIG. 8
FIG. 7

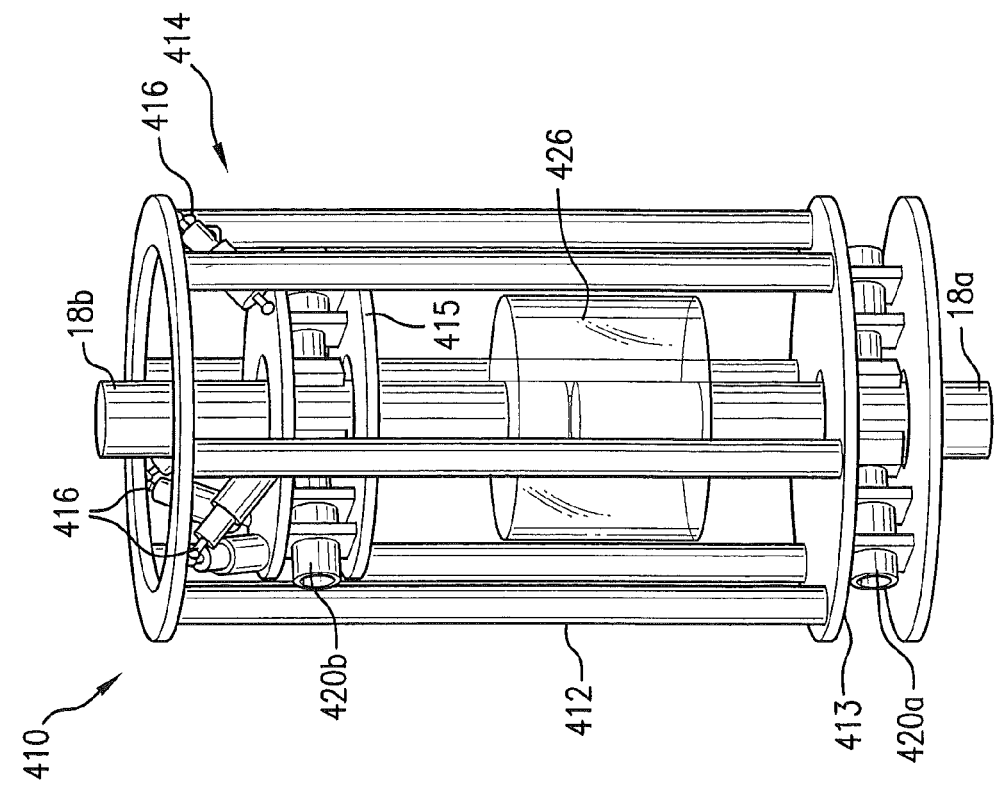
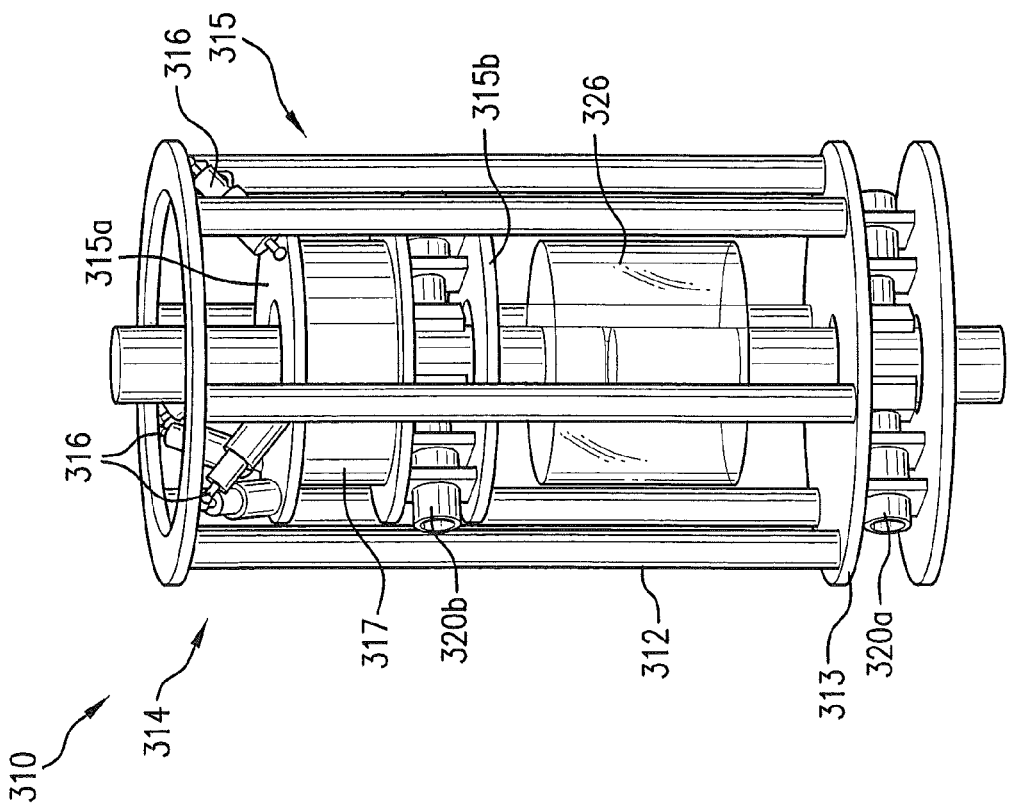

POSITIONING SYSTEM AND METHOD FOR AUTOMATED ALIGNMENT AND CONNECTION OF COMPONENTS

BACKGROUND

Threaded connections are typically used to assemble pipelines and downhole tubular strings due to the lack of time and cost efficient alternatives. For example, in current downhole tubular welding operations, the welding apparatus must be at least partially dismantled after each welding, resulting in significant delays in the tubular string assembly process. The use of threaded connections between components, while generally improving assembly time, degrade in quality more readily over time than welds, e.g., resulting in previously fluid tight connections becoming compromised. Problems in both types of connections are exacerbated by imprecise alignment (e.g., axial, radial, rotational, etc.) of the components before they are connected. Accordingly, advances are always well received that improve the quality, installation time, cost effectiveness, etc. of connections between tubular components.

BRIEF DESCRIPTION

A system for aligning and connecting components including a support structure, a measuring apparatus coupled to the support structure and operatively arranged to spatially analyze a first tubular component with respect to a second tubular component for determining an adjustment vector therebetween, an alignment apparatus coupled to the support structure and in data communication with the measuring apparatus, the alignment apparatus including a plurality of actuators operatively arranged in parallel for moving at least one of the first or second tubular components relative to the other for coaxially arranging the first and second tubular components in accordance with the adjustment vector and a connection apparatus coupled to the support structure and operatively arranged for connecting the first and second tubular components together.

A system for aligning components including a support structure, a measuring apparatus coupled to the support structure and operatively arranged to spatially analyze a first tubular component with respect to a second tubular component for determining an adjustment vector therebetween, and an alignment apparatus coupled to the support structure and in data communication with the measuring apparatus, the alignment apparatus including a plurality of actuators operatively arranged in parallel for moving the first tubular component relative to the second tubular component for coaxially arranging the first and second tubular components in accordance with the adjustment vector, wherein the support structure is positioned proximate a borehole and the system is operatively arranged to guide the first and second tubular components into the borehole.

BRIEF DESCRIPTION OF THE DRAWINGS

The following descriptions should not be considered limiting in any way. With reference to the accompanying drawings, like elements are numbered alike:

FIGS. 7-11 illustrate various embodiments of systems for aligning two components as described herein.

DETAILED DESCRIPTION

A detailed description of one or more embodiments of the disclosed apparatus and method are presented herein by way of exemplification and not limitation with reference to the Figures.

Figure 1:
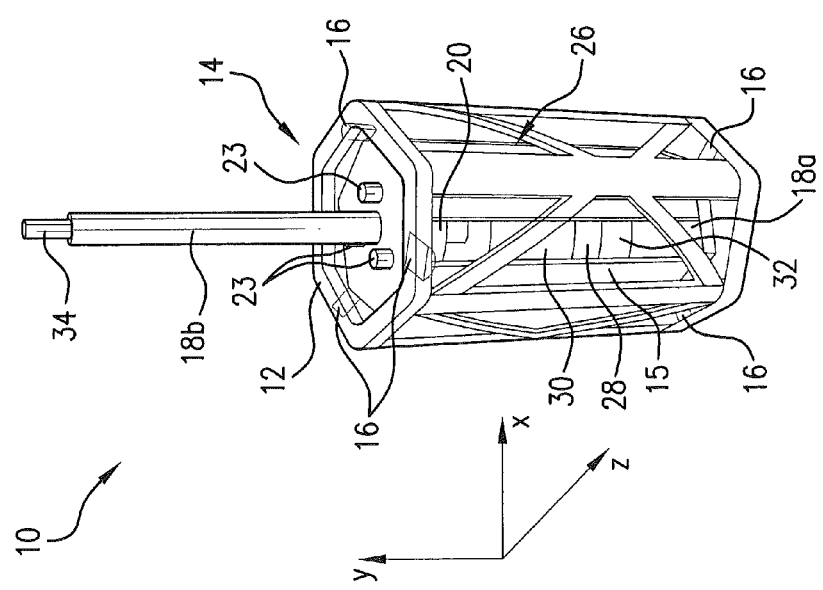
FIG. 1 illustrates a system for aligning and connecting two components as described herein.

Referring now to FIG. 1, an alignment and connection system 10 is shown. The system 10 as shown in FIG. 1 includes a base 12 that is, e.g., immovably mounted to or installed as part of a rig floor at a borehole drill site. Alternatively, the base 12 could be located in some other location and utilized for connecting tubulars or other components together, the borehole could be located horizontally, vertically, or in any other orientation, etc.

With the base 12 is housed an alignment apparatus 14, which in the illustrated embodiment includes an operating rack 15 secured to the base 12 via a plurality of positioning actuators 16. The rack 15 and the base 12 are, e.g., support structures for the system 10. The actuators 16 are arranged to enable relative movement of the rack 15 with respect to the base 12. The actuators 16 could be hydraulic, pneumatic, magnetic, electronic, mechanical, etc., or any combinations thereof, e.g., electromagnetic, hydro-mechanical, etc. For example, in one embodiment each of the actuators 16 is a hydraulic cylinder secured to the base 12 and the rack 15 via universal joints. In the illustrated embodiment, six actuators 16 are present (one hidden from view), with three at one end of the base 12 and rack 15, and three at the opposite end of the base 12 and the rack 15. Of course, in other embodiments any other number of actuators 16 could be included to provide sufficient accuracy of alignment apparatus 14 (e.g., movement of the rack 15 with respect to the base 12) and rigidity of the alignment apparatus 14 (and/or the rack 15) with respect to the base 12. Additionally, stiffeners and dampeners, e.g., springs, hydraulics, pneumatics, plates, beams, rods, etc. could be included for setting desired static and dynamic performance of the system 10.

By use of the system 10, a first tubular component 18a and a second tubular component 18b can be aligned and connected. For example, in one embodiment, the component 18b is immovably secured to the operating rack 15 via the clamping mechanism 20, while the component 18a is secured immovably relative to the base 12 via a suitable clamping mechanism, friction with walls of a borehole, etc. In this way, the component 18a can act essentially as a reference for further operations, e.g., alignment of the component 18b with the component 18a. The clamping mechanism 20 could be, e.g., arranged for exerting radially compressive forces, frictional forces, etc. on the component 18b due to at least one clamping actuator 23. The actuator(s) 23 could be any suitable type of actuator, e.g., hydraulic cylinders. The components 18a and 18b may generally take the form of pipes, tubulars, bottom hole assemblies, any other generally tube-like or axially projecting structures, or components thereof or related thereto regardless of cross-sectional shape, rotational symmetry, etc.

Figure 2:
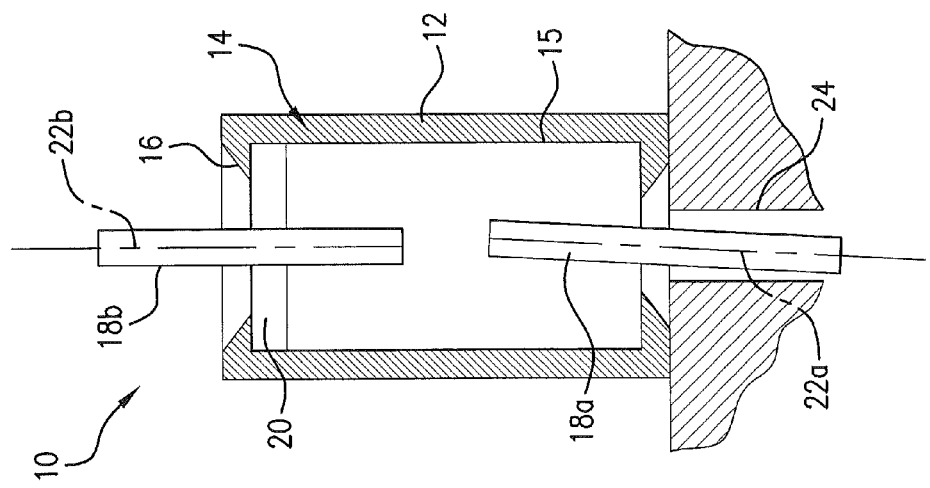
FIG. 2 schematically illustrates a misalignment between a first tubular component and a second tubular component.

In FIG. 2, the system 10 is shown schematically with the component 18a having an axis 22a that is misaligned with respect to an axis 22*b* of the component 18*b*. Since the rack 15 is clamped to the component 18*b*, the rack 15 is concentric about the axis 22*b* in the illustrated embodiment. However, in another embodiment, the axes of the operating rack 15 and the second component 18*b* could be offset by some predetermined or desired angle and locked at that angle, e.g., to better accommodate the curvature of a borehole 24 into which the components 18*a* and 18*b* are to be inserted. For example, the axes of the operating rack 15 and the second component 18*b* could be offset by angles of between about zero and ten degrees. Thus, by moving the rack 15, e.g. via the positioning actuators 16, the orientation of the component 18*b* relative to the component 18*a* can also be set. It is noted that the amount of misalignment between the axes 22*a* and 22*b* is for purposes of illustration and discussion only, and may be less or more in actual practice.

In the schematically illustrated embodiment of FIG. 2, the alignment apparatus 14 is positioned over the borehole 24 such that the components 18*a* and 18*b* can be efficiently aligned and connected as a string formed from these and other components is increasingly inserted into the borehole 24. Of course, the system 10 could be positioned on a rig floor some distance above the borehole, so the borehole 24 is also representative of a hole through the rig floor, etc. In the embodiment of FIG. 2 the component 18*a* is partially inserted into the borehole 24 and clamped, held, housed, or secured with respect to the borehole 24, the rig floor, and/or the base 12. By securing the component 18*b* to the rack 15 via the clamping mechanism 20, movement of the rack 15, coaxial along the axis 22*b*, will alter the orientation of the component 18*b*, thereby enabling alignment between the components 18*a* and 18*b*. It is to be appreciated that in other embodiments, the component 18*a* could be moveable with respect to the component 18*b*, or both could be movable with respect to each other, so long as relative movement between the components 18*a* and 18*b* is enabled. In other embodiments the apparatus 14 could be positioned in any other suitable location or in any other orientation (e.g., horizontal, vertical, etc.). It is also to be appreciated that after component 18*b* is inserted at least partially into the borehole 24 it resembles the component 18*a* such that a new component can be aligned with and connected to the opposite end of the component 18*b*, and the process repeated thereafter as necessary.

In general, the actuators 16 form a parallel kinematic or hybrid parallel-serial kinematic system for the alignment apparatus 14. That is, e.g., a parallel kinematic system employs a plurality of actuators that work synchronously to effect a change in orientation and/or position of a desired component, e.g., as an average of the movements of each actuator, as opposed to a serial kinematic system in which the movements of serially arranged actuators are, e.g., compounded together to effect movement of the desired component. The actuators 16 are arrangeable for enabling relative movement of the rack 15, and therefore the component 18*b*, with respect to the base 12, and therefore the component 18*a*, in up to six degrees of freedom, e.g., along three perpendicularly arranged coordinate axes (e.g., x, y, and z) and rotation about each of these axes (e.g., $\theta_x$, $\theta_y$, $\theta_z$; $\alpha$, $\beta$, $\gamma$; or some other symbolic designation).

Figure 3:
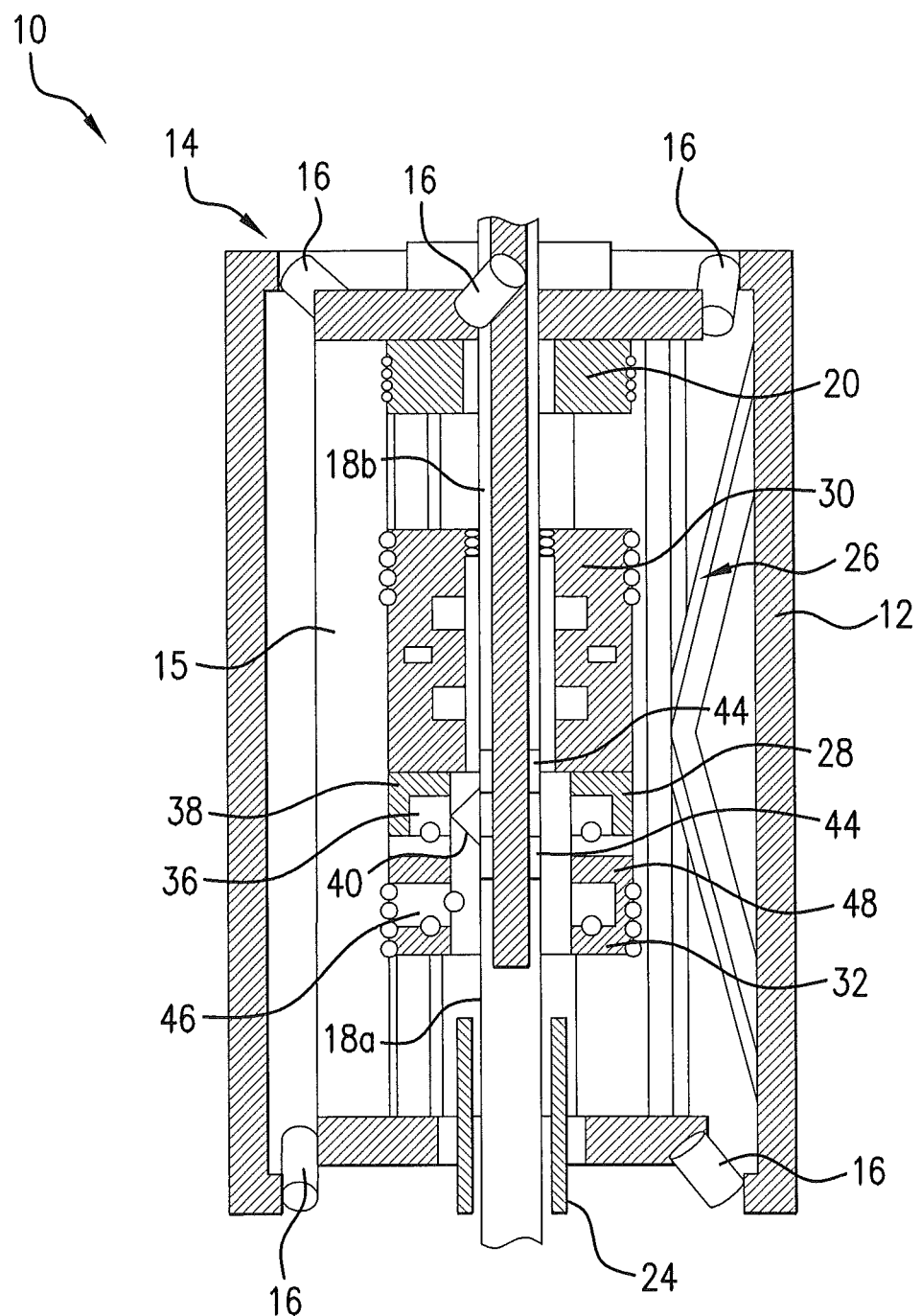
FIG. 3 illustrates a cross-sectional view of the system of FIG. 1.

A more detailed embodiment of the system 10 is shown in FIG. 3, in which the system 10 further includes an assembly 26 slidably and/or rotatably mounted within the rack 15. Any such rotatable or slidable elements could include suitable locking mechanisms, e.g., mechanical, electrical, hydraulic, magnetic, or other locks. The direction of movement of the assembly 26 is along and about the shared axis 22*b* of the rack 15 and the component 18*b*. The assembly 26 includes a measuring apparatus 28 for analyzing the adjacent ends of the components 18*a* and 18*b* in order to enable alignment and connection thereof. As discussed in more detail below, the assembly 26 can include other mechanisms, such as a processing apparatus 32, a connecting apparatus 30, an operating tool 34, etc.

Figure 4:
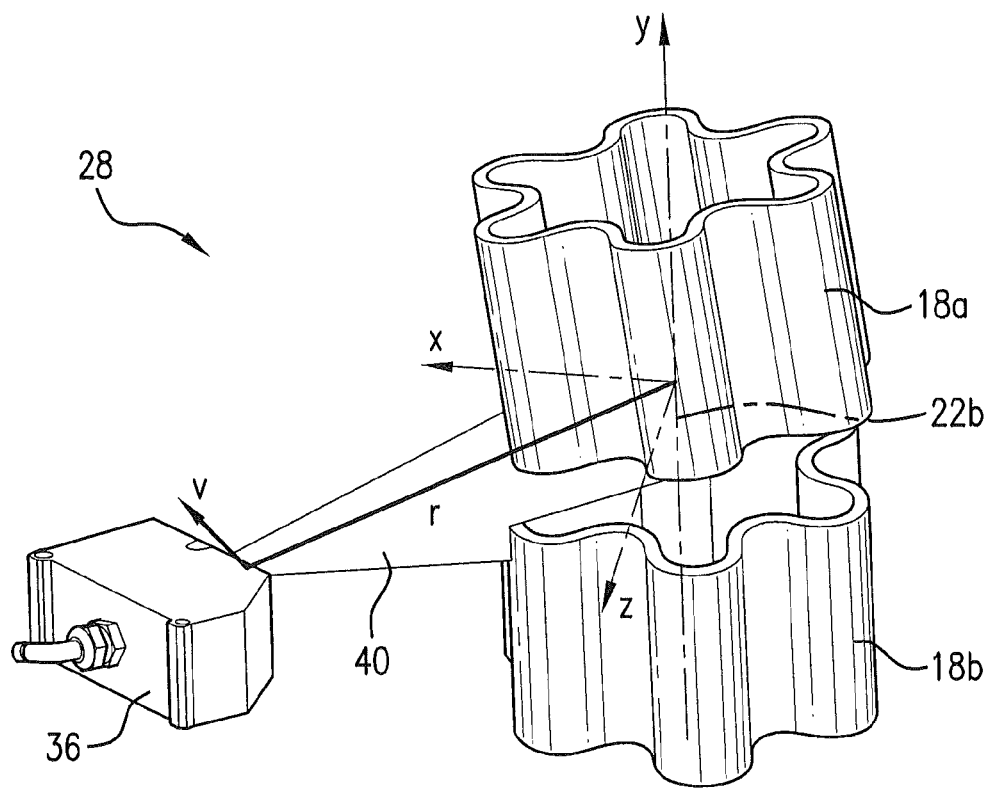
FIG. 4 illustrates two components being spatially analyzed by a transceiver of a measuring system.

After initial delivery of the component 18*b* to the component 18*a*, e.g., via the operating tool 34, and securing of the component 18*b* to the rack 15, e.g., via the clamping mechanism 20, the corresponding ends of the components 18*a* and 18*b* are spatially analyzed by the measuring apparatus 28. That is, the position, size, shape, orientation, etc. of the components 18*a* and 18*b* is determined with respect to each other and/or to a reference (e.g., the axis 22*b* as noted below). As shown in the embodiment of FIGS. 3 and 4, the measuring apparatus 28 takes the form of a transceiver 36 housed with a carriage 38. Of course, a separate transmitter, e.g., a laser diode, and receiver, e.g., a photosensor could be used. Alternatively, a digital imaging camera or some other measurement device could replace the transceiver 36 in other embodiments. As schematically illustrated in the embodiment FIG. 3, the transceiver 36 is configured to transmit a signal, e.g., a laser scan 40, and receive corresponding signals as a result of the laser scan 40 sweeping over the first and second tubular components 18*a* and 18*b* in order for the transceiver to detect the position and orientation of the components 18*a* and 18*b*.

The carriage 38 is, e.g., rotatable about the axis 22*b* for enabling the transceiver 36 to scan the entire 360 degrees about the interface between the components 18*a* and 18*b*. Thus, by taking a plurality of two dimensional readings about the entire periphery of the interface between the components 18*a* and 18*b*, an essentially three dimension model of the components can be achieved. Advantageously, this enables any cross-sectional shape to be analyzed, and the measurement of both components can occur simultaneously during a single orbit of the transceiver 36 about the components 18*a* and 18*b*. Additional sensors or transceivers could be mounted on the carriage 38 for back up, redundancy, to minimize error, etc. Alternatively, it is to be noted that the transceiver 36 or other sensors could be stationary while the component 18*b*, e.g., via the clamping mechanism 20, is rotatable.

By immovably securing the transceiver 36 to the carriage 38 and recording the rotational angle of the carriage 38 (e.g., by monitoring actuators that control rotation of the carriage 38), the transceiver 36 is always at a known position with respect to the axis 22*b*, as indicated by a reference vector r in FIG. 4. By comparing this reference vector r to the scanned position, shape, size, and orientation of the component 18*a*, a correction or adjustment vector can be calculated. For example, a vector component v corresponding to each rotational position of the carriage 38 as shown in FIG. 4 can be determined, which vector components v are ultimately compiled and summed, or, alternatively, a single adjustment vector can be created after all of the measurement data has been analyzed. In any event, the components 18*a* and 18*b* in the example of FIG. 4 have corrugated cross-sectional shapes that would be sensed by the transceiver 36 and aligned with respect to each other by appropriate rotation and movement of the component 18*b* in response to the calculated adjustment vector.

The adjustment vector can then be communicated as instructions to the alignment apparatus 14 in order to align the component 18*b* with the axis 22*a* of the component 18*a*, e.g., by parallel actuation of the positioning actuators 16. For example, the measuring apparatus 28 may include or be in data communication with any necessary computer components, such as RAM, ROM, hard drives or other data storage media, processors, arithmetic or other logic units, wired or wireless communication equipment, etc.

Figure 5:
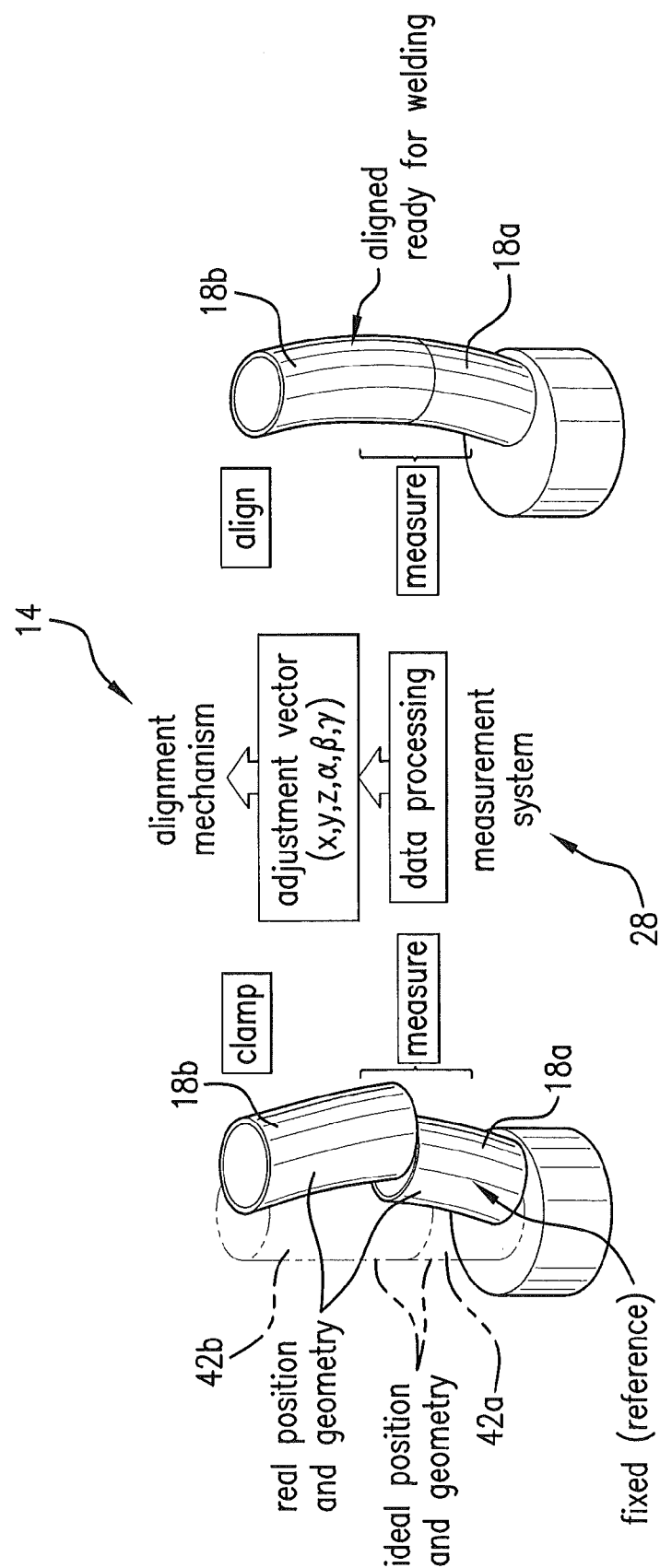
FIG. 5 illustrates two imperfect components being aligned according to a best fit therebetween.

Since the geometry of the components 18a and 18b is not likely ideal, the adjustment vectors v are each further determinable as a best match or fit including various flaws of the components 18a and 18b, such as ovality, curvature, asymmetry, etc. As an example, FIG. 5 depicts the components 18a and 18b having exaggerated abnormalities, i.e., curvature and ovality. An ideal geometry 42a and 42b is shown for the components 18a and 18b, respectively, which the system 10 strives to replicate. For example, the measuring apparatus 28 first analyzes the interface between the components 18a and 18b. The relative positions of the components 18a and 18b are then compared to each other and/or to the ideal geometry 42a and 42b. The adjustment or correction vectors v are then calculated (e.g., including variables x, y, z, $\alpha$, $\beta$, $\gamma$ to define six degrees of freedom). The adjustment vectors v are then passed to the alignment apparatus 14 comprising the actuators 16 in order to align the components 18a and 18b axially, then to rotate the component 18a to best match any ovality, curvature, etc. shared between the two components 18a and 18b, as shown on the right hand side of FIG. 5, in order to achieve a suitable interface for connection therebetween.

After measuring and alignment, the two components 18a and 18b are connected, e.g., by use of the connecting apparatus 30. In one embodiment, the connecting apparatus 30 is a welding tool for creating a weld at the interface between the two components 18a and 18b. The welding tool could utilize any desired welding technology, such as electron beam, pressure welding, etc. The clamping mechanism 20 and/or the actuators 16 can be actuated to hold the component 18b firmly against the component 18a during welding. In this way, the clamping mechanism 20 may take the form of a serial actuator for matingly engaging the ends of the components 18a and 18b after the positioning actuators 16 initially act in parallel to align the component 18b with the component 18a as described in detail above. In embodiments in which the apparatus 30 is a welding tool, a pair of seals 44 is includable on the operation tool 34 for sealing the interface between the components 18a and 18b, e.g., for assisting the welding process by creating a vacuum or protective gas chamber, etc.

In other embodiments, the components could be connected in other ways, such as by threaded connections. In such embodiments, the aforementioned ovality and curvature may not be as critical, as the components will thereafter need to undergo relative rotational movement in order to be threaded together. In such embodiments, the connecting apparatus 30 could comprise a clamping device or other radial support for assisting in the threading of the component 18b with the component 18a. In view hereof, it is to be noted that the clamping mechanism 20 could temporarily release the component 18b for the connecting apparatus 30 to operate, the clamping mechanism 20 could be rotatable about the axis 22b in conjunction with the apparatus 30, the clamping mechanism 20 could be rotatable about the axis 22b without the use of the assembly 30, etc. Additionally, as the positioning actuators 16 are arranged in parallel, these actuators can be used to deliver high torque to the component 18b, e.g., enabling the clamping mechanism 20 and/or connecting apparatus 30 to thread the components 18a and 18b most of the way and for the positioning actuators 16 to apply the final high torque needed to securely tighten the components together before insertion into the borehole.

Figure 6B:
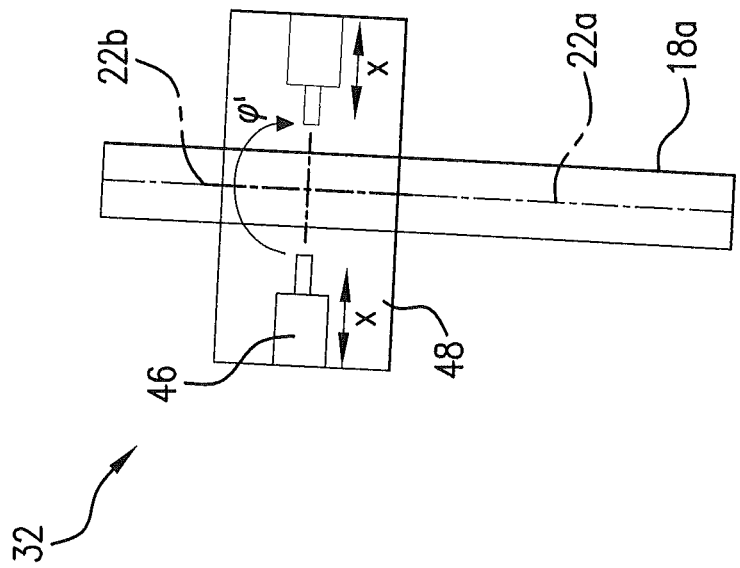
FIGS. 6A and 6B show a processing device being aligned with a component for processing.
Figure 6A:
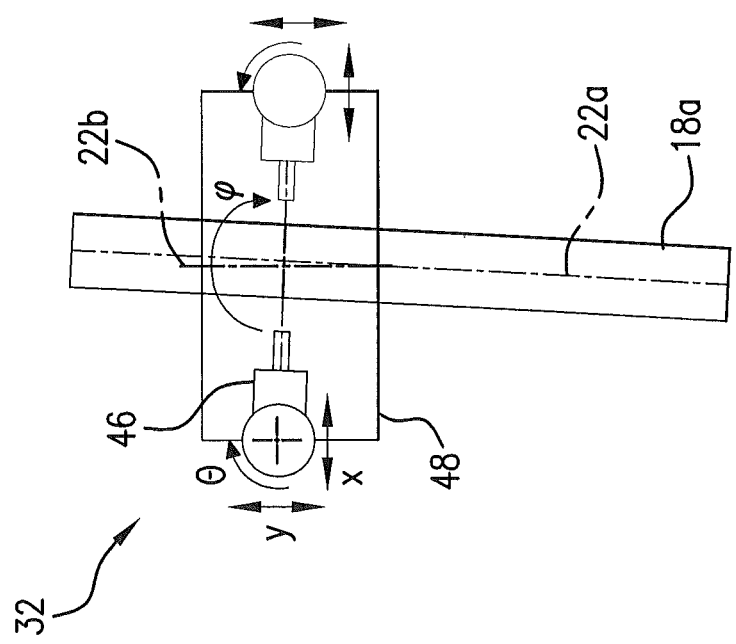

Before connection by the connecting apparatus 30, the processing apparatus 32 is included in some embodiments to first process the components 18a and/or 18b. For example, the processing apparatus 32 includes a tool 46 mounted on a carriage 48. The tool 46 includes any suitable cutting, milling, drilling, turning, grinding, sawing, or other device for preparing the surfaces of the components, detaching tubulars that are secured together, machining the components, finishing surfaces of the components, etc. The tool 46 may additionally include or be accompanied by tools for welding, brazing, gluing, adhering or otherwise affixing parts, e.g., bottom hole assembly parts, to the tubular components 18a and 18b. Multiple tools could be included for simultaneously processing, e.g., that are individually controlled or synchronously controlled, e.g., via a cam arrangement. The tool 46 could be used to smooth, clean, outline, reshape, or otherwise prepare the components 18a and 18b for welding; remove excess radially protruding material subsequent to welding; cut ends off of the components 18a and 18b to reveal fresh surfaces for connection; tap, repair, or otherwise form threads in the components 18a and 18b; etc. The carriage 48 is used to align the tool 46 with the components 18a and/or 18b, for example, by translating in the x, y, or z directions or effecting rotation therebout. Advantageously, making the processing apparatus part of the assembly 26 that is housed in the rack 15 enables the alignment apparatus 14 to align the processing apparatus 32 as described above. That is, as shown in FIGS. 6A and 6B, fixing the processing apparatus 32 along the axis 22b and then aligning the axis 22b with the axis 22a, aligns the tool 46 with the components 18a and 18b for enabling more accurate cuts therewith. Additionally, it is to be recognized that the processing apparatus 32 can also be used to cut existing welds or connections in an automated disassembly of a pipeline or drillstring, e.g., in response to emergency or severe weather situations, etc. With use of the measuring apparatus 28, it is also to be noted that both rotationally and non-rotationally symmetric components can be processed by the processing machine by communicating to the processing apparatus 32 the measured positions, orientations, etc. of the components 18a and 18b.

In some embodiments, the processing by the processing apparatus 32 occurs before measuring and alignment, while in others it occurs after. In another embodiment, the components 18a and 18b are analyzed by the measuring apparatus 28 and axially aligned by the alignment apparatus 14, processed by the processing apparatus 32, then reanalyzed and realigned to accommodate any changes that occurred as a result of the processing. While initially carrying the component 18b to the component 18a, e.g., with rig cables or the like, the measuring apparatus 28 may remain stationary, without rotating about the components 18a and 18b, in order to pre-align or get the component 18b relatively close (e.g., "in the ballpark of") the component 18a. Once pre-aligned, a full measurement as described above could occur. It is to be noted that generally with the steps described herein can be repeated as necessary, interchanged, etc. in various embodiments. For example, even after connection the components could be analyzed by the measuring apparatus 28 and separated by the processing apparatus 32 if, e.g., an error occurred, a poor weld or threaded connection results, etc. Advantageously, the embodiments described herein enable customizable, repeatable, and fully or partially automated systems for aligning and connecting components, thereby making installation more efficient, increasing safety by distancing personnel from heavy equipment and moving tools, etc.

In the embodiment of FIG. 7, a system 110 is shown. Many elements in the system 110 resemble those in the system 10 and have likewise been given the same reference numerals but prefaced with the numeral '1' (i.e., 100 has been added to the base numerals). Any such prefaced numeral generally shares the above-given descriptions of the corresponding components having reference numerals not including a leading '1', unless otherwise noted. The system 110 includes clamping mechanisms 120a and 120b, which are illustrated in the form of vice clamps, although other clamping mechanisms could be utilized. Similar to the clamping mechanism 20 of the above discussed embodiments, the clamping mechanism 120b for the component 18b is disposed in the rack 115. The clamping mechanism 120a for the component 18a is located in a floor 113 included with the base 112, e.g. part of a rig floor located above a borehole.

A system 210 is shown in FIG. 8, generally resembling the systems 10 and 110 discussed above. Each component in the system 110 that is similar to those in the above-discussed embodiments has been given the same base reference numeral, but prefaced with a '2' (i.e., 200 has been added to the base numeral). Components having reference numerals with a leading '2' share the above descriptions of the corresponding components having the same base reference numerals but without a leading '2', unless otherwise noted and therefore such descriptions are not repeated. The system 210 includes an alignment apparatus 214 comprising a first rack 215a portion and a second rack portion 215b. The first rack portion 215a generally resembles the rack 215 discussed above, in that it is movably secured to a base 212 via a plurality of positioning actuators 216. The first rack portion 215a could include, for example, the assembly 26 or any of its apparatuses, e.g. the measuring apparatus 28, the alignment apparatus 30, the connection apparatus 32, etc. The second rack portion 215b includes a clamping mechanism 220b and is separately movable via at least one additional actuator 217 arranged between the rack portions 215a and 215b. The actuators 217 are, e.g., arranged serially with the actuators 216, such that the system 210 is a hybrid kinematic system. Advantageously, by placing a clamping mechanism 220b on the rack portion 215b and other elements and/or apparatuses (e.g., the assembly 26, measuring apparatus 28, alignment apparatus 30, connection apparatus 32, etc.) on the other rack portion 215a, the component 18b can be moved longitudinally by the actuators 217 without disrupting the placement of the other elements and apparatuses. In order to achieve the above-discussed benefits, the rack portions 215a and 215b could both be immovably aligned along the axis 24b, with only the actuators 217 permitting relative movement between the rack portions 215a and 215b along the axis 24b. In this way, the component 18b could be rotationally and axially aligned as discussed above, and then pressed longitudinally against the component 18a by use of the actuators 217 with or without assistance from the actuators 216, e.g., for welding or other connection to be carried out.

In the embodiment of FIG. 9, a system 310 is shown. Each component in the system 310 that is similar to those in the above-discussed embodiments has been given the same base reference numeral, but prefaced with a '3' (i.e., 300 has been added to the base numeral). Any such prefaced numeral generally shares the above-given descriptions of the corresponding components having the same base reference numerals but not including a leading '3', unless otherwise noted, and therefore such descriptions are not repeated. Similar to the system 210, a rack 315 of the system 310 includes a first rack portion 315a and a second rack portion 315b. The first rack portion 315a is connected to a base 312 via a plurality of parallel actuators 316. In the illustrated embodiment, there are six actuators 316. Unlike the other embodiments discussed above, the actuators 316 are connected at only one end of the rack 315 and the base 312 as opposed to opposite ends. An additional actuator 317 takes the form of a rotation drive in the system 310 for rotatably connecting the second rack portions 315b to the first rack portion 315a. A clamp 320b is included with the rack portion 315b such that actuation of the rotation drive 317 results in rotation of the component 18b with respect to the component 18a. This actuator 317 is thus arranged in serial with the actuators 316 such that the system 310 is a hybrid kinematic system. An assembly 326 (e.g. including any or all of the apparatuses 28, 30, 32, etc.) is included between the components 18a and 18b for measuring, analyzing, processing, connecting, etc. as described previously. The assembly 326 could be connected to the rack portion 315b, separated controlled, etc.

In the embodiment of FIG. 10, a system 410 is shown. Each component in the system 410 that is similar to those in the above-discussed embodiments has been given the same base reference numeral, but prefaced with a '4' (i.e., 400 has been added to the base numeral). Any such prefaced numeral generally shares the above-given descriptions of the corresponding components having the same base reference numerals but not including a leading '4', unless otherwise noted and therefore such descriptions are not repeated. Similar to the system 310, the system 410 includes a plurality of parallel actuators located at one end of a base 412 and a rack 415 only. However, in the system 410, no rotational drive is included and relative rotation between the components 18a and 18b is instead controlled, e.g., solely by the actuators 416. An assembly 426 (e.g. including any or all of the apparatuses 28, 30, 32, etc.) could be connected to the rack 415, be separately controlled, etc.

Figure 11:
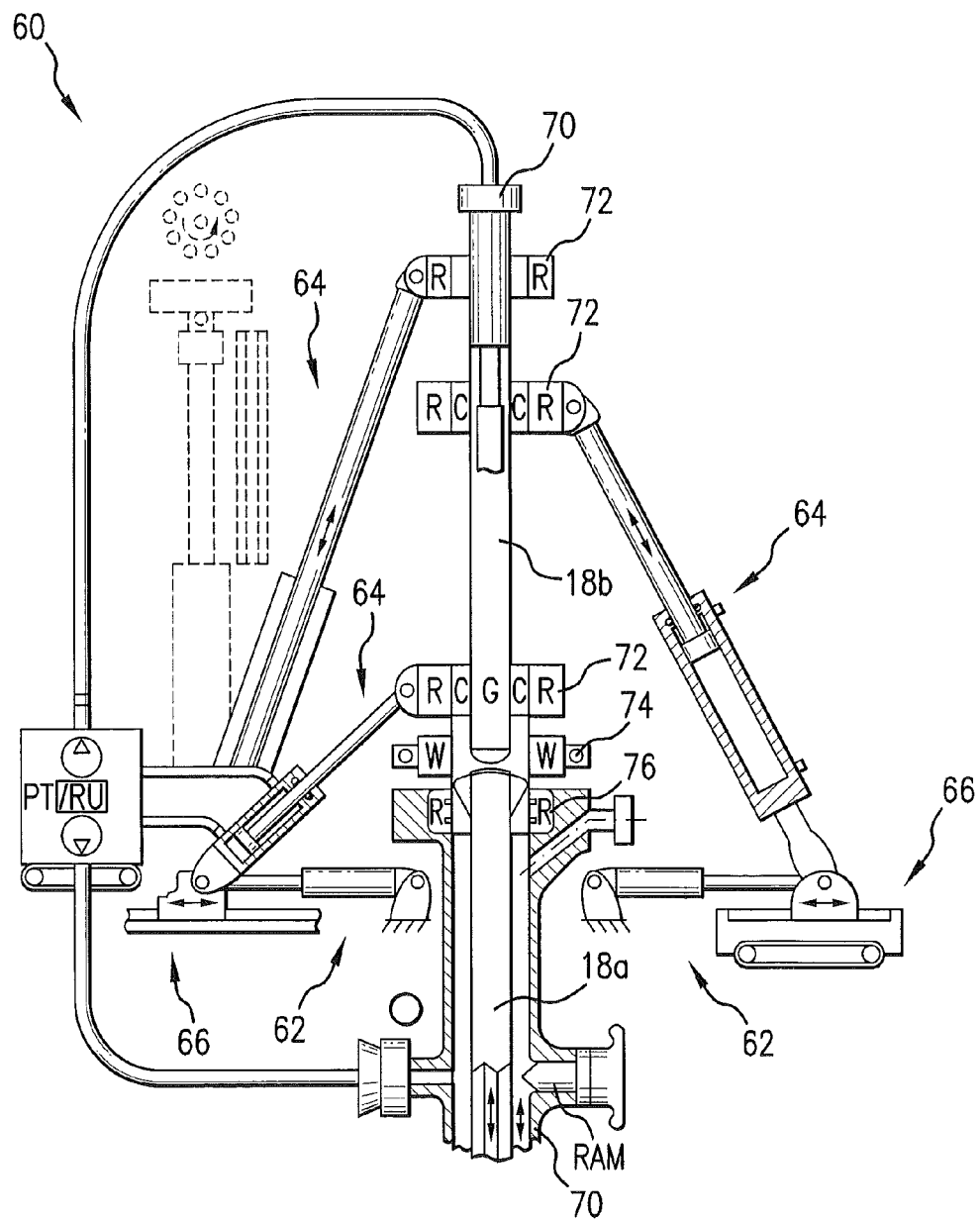

A system 60 is provided in FIG. 11 as an embodiment that does not at first review appear to resemble the previously discussed embodiments. Specifically, the system 60 is an example of a hybrid kinematic system. However, it will become clear that the system 60 shares many similarities and advantages to the above embodiments. The system 60 includes a first set of actuators 62 and a second set of actuators 64, with each of the actuators 64 associated with one of the actuators 62 (one actuator 62 hidden from view). The first set of actuators 62 is arranged in serial with the second set of actuators 64, while the second set of actuators 64 are arranged in parallel with respect to each other. Each of the first actuators 62 are connected to one end of one of the second actuators 64 at, e.g., a track or slider 66. The tracks 66 and the actuators 62 are, e.g., secured to a base 68, located, e.g., above or proximate to a blowout preventer 70, a borehole, etc.

A plurality of clamping devices 72 is included for attaching each of the actuators 64 to the component 18b. It is noted that in lieu of external longitudinally extending support beams and other framework, as shown in each of the racks 15, 15a, and 15b, the system 60 instead directly clamps onto the component 18b, thereby maintaining coaxial arrangement between each of the clamping devices 72 and the component 18b. By including an assembly 74, e.g., including the measuring apparatus 28, the connecting apparatus 30, the processing apparatus 32, etc., and securing the assembly 74 to one of the clamping devices 72, the same advantages discussed above are maintained, as the assembly 74, and therefore all of the desired apparatuses, are aligned with the component 18b for processing, measuring, connecting, etc. Further, in view of the foregoing, it is noted that by securing the actuators 62 and the tracks 66 properly, e.g., such that the direction of actuation of at least some of the actuators 62 are not parallel to others of the actuators 62, and making the clamping devices 72 at least partially rotatable, that six degrees of freedom can be accomplished.

Another feature or advantage is appreciable in view of the system 60 in FIG. 11. Namely, the system 60 includes a rotatable clamp mechanism 76 for the component 18a. The rotatable clamp mechanism 76 is included, for example, with the blowout preventer 70. It will be appreciated by one of ordinary skill in the art that the above-discussed clamps for the component 18a, e.g., the clamps 120a, 220a, 320a, 420a, etc., could all be similarly modifiable such that they too are rotatable, e.g., including a mechanism similar to the mechanism 76 (or the drive 317, etc.). The rotatable clamp mechanism 76 enables the component 18a, which is at least partially inserted downhole (or attached to a string inserted downhole) to be rotated along with the component 18b. Advantageously, this enables, for example, both components 18a and 18b to be rotated simultaneously at the same speed for welding the components together via processes such as laser welding, e-beam welding, etc. The mechanism 76 also, e.g., enables the components 18a and 18b to be rotated in opposite directions or different speeds, e.g., one at high speed and one at low speed, for enabling more efficient friction welding, or the threading of the components 18a and 18b together. Rotation of the component 18a during connection also reduces differential sticking of the downhole string including the component 18a, improves the transport of downhole cuttings during drilling, and reduces or eliminates interruptions between the drilling or string installation process and the connection process. By securely clamping the component 18a at its end, for example, any flexure, curving, bending, etc. caused in the downhole string connected to the component 18a during rotation thereof will not affect the end of the component 18a, so that alignment and connection can occur. As another example, the aforementioned apparatuses, e.g., the measuring apparatus 28, processing apparatus 30 and/or the connection apparatus 32 could be rotated in an opposite direction to that of the components 18a and 18b for even further increasing the speed of analysis, preparation, processing, or connection of the components 18a and 18b.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A system for aligning and connecting components comprising:
    a support structure;
    a measuring apparatus coupled to the support structure and operatively arranged to spatially analyze a first tubular component with respect to a second tubular component for determining an adjustment vector therebetween;
    an alignment apparatus coupled to the support structure and in data communication with the measuring apparatus, the alignment apparatus including a plurality of actuators operatively arranged in parallel for moving both the first and the second tubular components relative to the other for coaxially arranging the first and the second tubular components in accordance with the adjustment vector; and
    a connection apparatus coupled to the support structure and operatively arranged for connecting the first and the second tubular components together.

2. The system of claim 1, wherein the support structure is an operating rack movably secured to a base via the plurality of actuators.

3. The system of claim 2, wherein the first tubular component is secured to the base and the second tubular component is secured to the operating rack.

4. The system of claim 2, wherein the second tubular component is immovably coaxially aligned with the operating rack.

5. The system of claim 2, wherein the second tubular component is immovably locked at a predetermined angle with respect to respective axes of the operating rack and the second tubular component.

6. The system of claim 1, wherein the measuring apparatus, the alignment apparatus, the connecting apparatus, or combinations of at least one of the foregoing are movable along an axis of the second tubular component.

7. The system of claim 1, wherein the support structure comprises a first rack portion and a second rack portion, the first rack portion secured to a base via the plurality of actuators, the second rack portion secured to the first rack via at least one secondary actuator.

8. The system of claim 7, wherein the first tubular component is secured to the base and the second tubular component is secured to the second rack portion.

9. The system of claim 7, wherein the first rack portion and the second rack portion are coaxially arranged and the secondary actuator enables longitudinal movement between the first rack portion and the second rack portion along a shared axis.

10. The system of claim 1, wherein the measuring apparatus is peripherally rotatable about an interface between the first and the second tubular components.

11. The system of claim 1, wherein the measuring apparatus includes a transmitter and a receiver.

12. The system of claim 11, wherein the transmitter and receiver use imaging, optics, lasers, or combinations of the foregoing.

13. The system of claim 1, wherein the adjustment vector includes six variables.

14. The system of claim 13, wherein the six variables are defined along each of three perpendicularly arranged axial dimensions and by rotation about each of the three axial directions.

15. The system of claim 1, wherein the connecting apparatus is rotatable for threadingly securing the first and the second tubular components together.

16. The system of claim 1, wherein the connecting apparatus includes a welding tool for welding the first and the second tubular components together.

17. The system of claim 1, further comprising a processing apparatus for machining one or both of the first and the second tubular components.

18. The system of claim 17, wherein the processing apparatus is operatively arranged to: prepare the first and the second tubular components for welding; remove excess material after welding; cut the first and the second tubular components for disassembly; form threads into the first and the second tubular components; or combinations including at least two of the foregoing.

19. The system of claim 17, wherein the processing apparatus is operatively arranged to weld, braze or glue components onto the first tubular component, the second tubular component, or combinations including at least one of the foregoing.

20. The system of claim 1, wherein the first tubular component, the second tubular component, or combinations including at least one of the foregoing are bottom hole assembly components.

21. The system of claim 1, wherein the first and the second tubular components are also rotationally aligned by the alignment apparatus.

22. The system of claim 19, wherein creation of the adjustment vector includes consideration of cross-sectional shape, ovality, curvature, or combinations of at least one of the foregoing of the first and the second tubular components, as analyzed by the measuring apparatus.

23. The system of claim 1, wherein the measuring apparatus, the alignment apparatus, the connection apparatus are repeatable and operable in any order.

24. The system of claim 1, further comprising at least one serial actuator connected serially with the plurality of actuators arranged in parallel.

25. A system for aligning components comprising:
a support structure;
a measuring apparatus coupled to the support structure and operatively arranged to spatially analyze a first tubular component with respect to a second tubular component for determining an adjustment vector therebetween; and
an alignment apparatus coupled to the support structure and in data communication with the measuring apparatus, the alignment apparatus including a plurality of actuators operatively arranged in parallel for moving both the first tubular component and the second tubular component relative to the other for coaxially arranging the first and the second tubular components in accordance with the adjustment vector, wherein the support structure is positioned proximate a borehole and the system is operatively arranged to guide the first and the second tubular components into the borehole.

26. The system of claim 25, wherein the second tubular component is part of a string at least partially inserted into the borehole during alignment of the first and the second tubular components.

27. The system of claim 26, wherein the second tubular component is secured to a rotatable mechanism for rotating the first tubular component and the string during alignment of the first and the second tubular components.

28. The system of claim 27, wherein rotation of the rotatable mechanism is operatively arranged to assist in forming a welded or threaded connection between the first tubular component and the second tubular component after alignment thereof.

* * * * *